(12) United States Patent
Shih et al.

(10) Patent No.: US 11,967,168 B2
(45) Date of Patent: Apr. 23, 2024

(54) FINGERPRINT IMAGE GENERATION METHOD AND DEVICE FOR SAVING MEMORY

(71) Applicant: NOVATEK MICROELECTRONICS CORP., Hsinchu (TW)

(72) Inventors: Weilun Shih, Hsinchu (TW); Wu-Wei Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/548,602

(22) Filed: Dec. 13, 2021

(65) Prior Publication Data

US 2022/0189196 A1 Jun. 16, 2022

Related U.S. Application Data

(60) Provisional application No. 63/124,103, filed on Dec. 11, 2020.

(51) Int. Cl.
*G06V 40/13* (2022.01)
*G06F 3/041* (2006.01)
*G06V 10/22* (2022.01)
*G06V 40/12* (2022.01)

(52) U.S. Cl.
CPC .......... *G06V 40/12* (2022.01); *G06F 3/0416* (2013.01); *G06V 10/235* (2022.01)

(58) Field of Classification Search
None
See application file for complete search history.

(56) References Cited

U.S. PATENT DOCUMENTS

| 8,730,259 B2 | 5/2014 | Araki et al. |
| 9,342,593 B2 | 5/2016 | Araki et al. |
| 9,454,259 B2 | 9/2016 | Lee et al. |

(Continued)

FOREIGN PATENT DOCUMENTS

| CN | 106778163 | 5/2017 |
| CN | 106940707 | 7/2017 |

(Continued)

OTHER PUBLICATIONS

"Office Action of Taiwan Counterpart Application", dated Sep. 19, 2022, p. 1-p. 3.

(Continued)

*Primary Examiner* — Joseph R Haley
(74) *Attorney, Agent, or Firm* — JCIPRNET

(57) ABSTRACT

A method and device of fingerprint image generation for saving memory. The method includes generating a first fingerprint image of an original data size according to a plurality of first analog sensing signals which are read from a fingerprint sensor array before an exposure period ends. Then the first fingerprint image represented by a first data size which is equivalent to or smaller than the original data size is stored. a second fingerprint image of the original data size is generated after generating the first fingerprint image of the original data size according to a plurality of second analog sensing signals which are read from the fingerprint sensor array during the exposure period. The second fingerprint image represented by a compressed data size smaller than the original data size is then stored.

12 Claims, 17 Drawing Sheets

(56) References Cited

U.S. PATENT DOCUMENTS

| | | |
|---|---|---|
| 9,606,672 B2 | 3/2017 | Lee et al. |
| 9,830,009 B2 | 11/2017 | Lee et al. |
| 10,775,926 B2 | 9/2020 | Jhang et al. |
| 11,093,080 B2 | 8/2021 | Chen et al. |
| 11,112,953 B2 | 9/2021 | Kim et al. |
| 11,507,225 B2 | 11/2022 | Chen et al. |
| 2005/0226479 A1 | 10/2005 | Takahashi |
| 2008/0013808 A1 | 1/2008 | Russo et al. |
| 2009/0051700 A1 | 2/2009 | Araki et al. |
| 2012/0120106 A1 | 5/2012 | Araki et al. |
| 2016/0239150 A1 | 8/2016 | Lee et al. |
| 2016/0371554 A1 | 12/2016 | Lee et al. |
| 2017/0010753 A1 | 1/2017 | Lee et al. |
| 2017/0139515 A1* | 5/2017 | Lee ................. G06F 3/0443 |
| 2017/0192654 A1 | 7/2017 | Kim et al. |
| 2020/0104618 A1* | 4/2020 | Yu .................... G06V 40/12 |
| 2020/0210065 A1 | 7/2020 | Chen et al. |
| 2020/0241725 A1 | 7/2020 | Jhang et al. |
| 2021/0294492 A1 | 9/2021 | Chen et al. |
| 2023/0021934 A1 | 1/2023 | Chen et al. |

FOREIGN PATENT DOCUMENTS

| | | |
|---|---|---|
| CN | 111488561 | 8/2020 |
| CN | 111819574 | 10/2020 |
| TW | 200606745 | 2/2006 |
| TW | 200917119 | 4/2009 |
| TW | 201725501 | 7/2017 |
| TW | 202024978 | 7/2020 |

OTHER PUBLICATIONS

"Office Action of Taiwan Counterpart Application", dated Jun. 2, 2023, p. 1-p. 7.

* cited by examiner

| 1st page of image data | | |
|---|---|---|
| 1157 | 897 | 879 |
| 1235 | 873 | 870 |
| 1149 | 716 | 790 |

FIG. 2B

| 2nd page of image data | | |
|---|---|---|
| 1436 | 1143 | 1136 |
| 1498 | 1141 | 1133 |
| 1423 | 986 | 1035 |

FIG. 2C

| Difference value between the 1st and the 2nd image | | |
|---|---|---|
| 279 | 246 | 257 |
| 263 | 268 | 263 |
| 274 | 270 | 245 |

FIG. 2D

| 2nd page of image data | | |
|---|---|---|
| 1436 | 1143 | 1136 |
| 1498 | 1141 | 1133 |
| 1423 | 986 | 1035 |

FIG. 3B

| 3rd page of image data | | |
|---|---|---|
| 1716 | 1433 | 1403 |
| 1789 | 1425 | 1419 |
| 1750 | 1231 | 1352 |

FIG. 3C

| Difference value between the 2nd and the 3rd image | | |
|---|---|---|
| 280 | 290 | 267 |
| 291 | 284 | 286 |
| 327 | 245 | 317 |

FIG. 3D

| 1st page of image data | | | 2nd page of image data | | | 3rd page of image data | |
|---|---|---|---|---|---|---|---|
| 1157 | 897 | 879 | 1436 | 1143 | 1136 | 1716 | 1433 | 1403 |
| 1235 | 873 | 870 | 1498 | 1141 | 1133 | 1789 | 1425 | 1419 |
| 1149 | 716 | 790 | 1423 | 986 | 1035 | 1750 | 1231 | 1352 |

| Subtract 716 from the 1st page | | | Subtract 986 from the 2nd page | | | Subtract 1231 from the 3rd page | | |
|---|---|---|---|---|---|---|---|---|
| 441 | 181 | 163 | 450 | 157 | 150 | 485 | 202 | 172 |
| 519 | 157 | 154 | 512 | 155 | 147 | 558 | 194 | 188 |
| 433 | 0 | 74 | 437 | 0 | 49 | 519 | 0 | 123 |

FIG. 4A

| 1st page of image data | | |
|---|---|---|
| 1157 | 897 | 879 |
| 1235 | 873 | 870 |
| 1149 | 716 | 790 |

| 2nd page of image data | | |
|---|---|---|
| 1436 | 1143 | 1136 |
| 1498 | 1141 | 1133 |
| 1423 | 986 | 1035 |

| 3rd page of image data | | |
|---|---|---|
| 1716 | 1433 | 1403 |
| 1789 | 1425 | 1419 |
| 1750 | 1231 | 1352 |

| Subtract 716 from the 1st page | | |
|---|---|---|
| 441 | 181 | 163 |
| 519 | 157 | 154 |
| 433 | 0 | 74 |

| Subtract 716 from the 2nd page | | |
|---|---|---|
| 720 | 427 | 420 |
| 782 | 425 | 417 |
| 707 | 270 | 319 |

| Subtract 716 from the 3rd page | | |
|---|---|---|
| 1000 | 717 | 687 |
| 1073 | 709 | 703 |
| 1034 | 515 | 636 |

FIG. 5A

| 17 | 19 | 21 | 22 | 24 | 21 | 17 | 19 | 27 | 20 | 17 | 18 |
|----|----|----|----|----|----|----|----|----|----|----|----|
| 14 | 17 | 23 | 21 | 21 | 27 | 14 | 17 | 28 | 22 | 19 | 20 |
| 19 | 17 | 22 | 27 | 24 | 28 | 19 | 17 | 28 | 25 | 21 | 22 |
| 19 | 20 | 21 | 26 | 27 | 32 | 19 | 20 | 32 | 26 | 24 | 23 |
| 19 | 21 | 21 | 27 | 31 | 28 | 19 | 21 | 40 | 32 | 27 | 24 |
| 22 | 22 | 25 | 30 | 29 | 32 | 22 | 22 | 44 | 34 | 35 | 30 |
| 23 | 25 | 29 | 30 | 32 | 37 | 52 | 59 | 49 | 40 | 36 | 29 |
| 24 | 26 | 30 | 34 | 37 | 47 | 81 | 94 | 64 | 46 | 34 | 32 |
| 30 | 28 | 29 | 37 | 44 | 65 | 1010 | 1184 | 85 | 66 | 45 | 34 |
| 30 | 32 | 37 | 41 | 48 | 117 | 1223 | 1233 | 97 | 91 | 45 | 31 |
| 29 | 29 | 35 | 42 | 48 | 62 | 291 | 557 | 195 | 72 | 47 | 30 |
| 30 | 35 | 35 | 37 | 41 | 46 | 65 | 72 | 64 | 49 | 40 | 28 |
| 28 | 26 | 32 | 41 | 42 | 39 | 54 | 55 | 51 | 37 | 32 | 25 |
| 27 | 32 | 32 | 41 | 43 | 38 | 27 | 32 | 32 | 41 | 32 | 27 |
| 28 | 30 | 35 | 40 | 30 | 35 | 28 | 30 | 35 | 40 | 31 | 35 |
| 28 | 30 | 34 | 28 | 30 | 34 | 28 | 30 | 34 | 28 | 30 | 34 |

FIG. 6C

FINGERPRINT IMAGE GENERATION METHOD AND DEVICE FOR SAVING MEMORY

CROSS-REFERENCE TO RELATED APPLICATION

This application claims the priority benefit of U.S. provisional patent application Ser. No. 63/124,103, filed on Dec. 11, 2020. The entirety of the above-mentioned patent application is hereby incorporated by reference and made a part of this specification.

BACKGROUND OF THE INVENTION

1. Field of the Invention

The present disclosure relates to fingerprint image generation, and in particular to a method and device for fingerprint image generation for saving memory, reducing the amount of bandwidth, and improving efficiency of a fingerprint recognition process.

2. Description of the Related Art

Biometric data processing or biometrics authentication is utilized for identifying individuals. Each person's biometrics, such as fingerprints, are unique to the person.

In order to get better images, a fingerprint sensor array takes fingerprint images. For example, the fingerprint sensor array has 270×270 pixels and each picture's data size is 270×270×12 bits. As a result, in order to capture the six images, the static random access memory (SRAM) size needed to store the six images is a minimum storage size for 270×270×12-bit×6 or 6 pieces of 270×270×12 bits of data.

Unfortunately, this amount of data results in slow fingerprint acquisitions, excessive bandwidth requirements, and increased data transfer sizes.

Therefore, it is desirable to have improvements in fingerprint recognition systems that increase the efficiency of the fingerprint image generation process.

BRIEF SUMMARY OF THE INVENTION

An objective of the present disclosure is to provide a method and device of fingerprint image generation for saving memory.

The method and device of fingerprint image generation comprises generating a first fingerprint image of an original data size according to a plurality of first analog sensing signals which are read from a fingerprint sensor array before an exposure period ends; storing the first fingerprint image represented by a first data size which is equivalent to or smaller than the original data size; generating a second fingerprint image of the original data size after generating the first fingerprint image of the original data size according to a plurality of second analog sensing signals which are read from the fingerprint sensor array during the exposure period; and storing the second fingerprint image represented by a compressed data size smaller than the original data size.

In an embodiment of the present invention the method of fingerprint image generation for saving memory further comprises generating a third fingerprint image of the original data size after generating the second fingerprint image of the original data size according to a plurality of third analog sensing signals which are read from the fingerprint sensor array during the exposure period; and storing the third fingerprint image represented by the compressed data size smaller than the original data size.

In an embodiment of the present invention the method of fingerprint image generation for saving memory further comprises generating the second fingerprint image represented by the compressed data size by calculating a difference image between the first fingerprint image of the original data size and the second fingerprint image of the original data size.

In an embodiment of the present invention the method further comprises storing the second fingerprint image of the original data size.

In an embodiment of the present invention the method further comprises generating a third fingerprint image of the original data size after generating the second fingerprint image of the original data size according to a plurality of third analog sensing signals which are read from the fingerprint sensor array during the exposure period; generating the third fingerprint image represented by the compressed data size smaller than the original data size by calculating a difference image between the second fingerprint image of the original data size and the third fingerprint image of the original data size; and storing the third fingerprint image represented by the compressed data size.

In an embodiment of the present invention the method further comprises storing the first fingerprint image of the original data size; acquiring a first reference pixel data among the first fingerprint image of the original data size, wherein the first reference pixel data is the minimal pixel data among the first fingerprint image of the original data size; and generating the first fingerprint image represented by the first data size smaller than the original data size by subtracting the first reference pixel data from the first fingerprint image of the original data size.

In an embodiment of the present invention the method further comprises storing the second fingerprint image of the original data size; acquiring a second reference pixel data among the second fingerprint image of the original data size, wherein the second reference pixel data is the minimal pixel data among the second fingerprint image of the original data size; and generating the second fingerprint image represented by the compressed data size by subtracting the second reference pixel data from the second fingerprint image of the original data size.

In an embodiment of the present invention the method further comprises generating the second fingerprint image represented by the compressed data size by subtracting the first reference pixel data from the second fingerprint image of the original data size.

In an embodiment of the present invention the method further comprises storing the first fingerprint image of the original data size; acquiring a first reference pixel data among the first fingerprint image of the original data size, wherein the first reference pixel data is the minimal pixel data among the first fingerprint image of the original data size; and generating the second fingerprint image represented by the compressed data size smaller than the original data size by subtracting the first reference pixel data from the second fingerprint image of the original data size.

In an embodiment the method further comprises transmitting the first fingerprint image represented by the first data size to and the second fingerprint image represented by the compressed data size to a back-end processor.

In an embodiment the method further comprises transmitting a "compressed" reference pixel data, which is generated based on the minimal pixel data among the second fingerprint image of the original data size to the back-end processor; and transmitting a "compressed" reference pixel data, which is generated based on the minimal pixel data among the first fingerprint image of the original data size to the back-end processor.

In an embodiment of the present invention the method of fingerprint image generation for saving memory further comprises determining a touch position of a finger touch event occurring on a touch display screen, wherein the touch display screen comprises a touch sensor array comprising a plurality of touch sensing electrodes and a fingerprint sensor array comprising a plurality of fingerprint sensing pixels; finding out positions of touch sensing electrodes which are corresponding to a plurality of touch sensing data larger or not less than a threshold; generating a first fingerprint image corresponding to a fingerprint readout area which is determined based on the touch position; and storing a part of the first fingerprint image, taken as a valid fingerprint image, wherein an area of the valid fingerprint image is determined according to the positions of the touch sensing electrodes which are corresponding to the touch sensing data larger or not less than the threshold.

In an embodiment the method further comprises generating a first fingerprint image corresponding to a fingerprint readout area which is determined based on a touch position; and not storing a part of the first fingerprint image, which are a plurality of fingerprint sensing data not in a predetermined code range.

In an embodiment of the present invention the method of fingerprint image generation for saving memory further comprises storing the other part of the first fingerprint image, which are a plurality of fingerprint sensing data in the predetermined code range.

Another objective of the present disclosure is to provide a method for fingerprint image generation for saving memory such as static random access memory (SRAM).

The fingerprint image generation method according to an embodiment of the present invention comprises capturing a plurality of fingerprint images. The fingerprint first image is captured at an original data size. For example, the image is captured at an original data size of 270×270×12-bits data.

The second image is then captured. In an embodiment the second image data is subtracted from the first image data (the same position is subtracted) to obtain the difference between the first and second image. The difference between first image data and second image data will be a positive number when the second picture is subtracted from the first picture. The difference value between the first image and the second image are then stored in memory for the second image data thereby saving memory.

A third image is then captured. The third image data is subtracted from the second image data (the same position is subtracted) to obtain the difference between the second and the third image. Since the third picture has a longer exposure than the second image, the difference between second image and third image will be a positive number when the third image is subtracted from the second image.

This process is performed for a plurality of fingerprint images. For example, six fingerprint images.

The RAW data of the fingerprint images exposed at different times will be close. The SRAM only stores the original data size of the first image, and all others have the differences stored.

In an embodiment of the present invention a device for fingerprint image generation for saving memory comprises an analog to digital converter for generating a first fingerprint image of an original data size according to a plurality of first analog sensing signals which are read from a fingerprint sensor array before an exposure period ends; a memory for storing the first fingerprint image represented by a first data size which is equivalent to or smaller than the original data size; the analog to digital converter generating a second fingerprint image of the original data size after generating the first fingerprint image of the original data size according to a plurality of second analog sensing signals which are read from the fingerprint sensor array during the exposure period; and the memory storing the second fingerprint image represented by a compressed data size smaller than the original data size.

In an embodiment of the present invention the device for fingerprint image generation for saving memory comprises a touch controller for determining a touch position of a finger touch event occurring on a touch display screen, wherein the touch display screen comprises a touch sensor array comprising a plurality of touch sensing electrodes and a fingerprint sensor array comprising a plurality of fingerprint sensing pixels; the touch controller finding out positions of touch sensing electrodes which are corresponding to a plurality of touch sensing data larger or not less than a threshold; a fingerprint readout circuit for generating a first fingerprint image corresponding to a fingerprint readout area which is determined based on the touch position; and the fingerprint readout circuit storing a part of the first fingerprint image, taken as a valid fingerprint image, wherein an area of the valid fingerprint image is determined according to the positions of the touch sensing electrodes which are corresponding to the touch sensing data larger or not less than the threshold.

In an embodiment of the present invention the device for fingerprint image generation for saving memory comprises a fingerprint readout circuit for generating a first fingerprint image corresponding to a fingerprint readout area which is determined based on a touch position; and the fingerprint readout circuit not storing a part of the first fingerprint image, which are a plurality of fingerprint sensing data not in a predetermined code range.

As a result of utilizing the present invention, the memory is saved, transmission time is reduced, and user experience is improved.

To achieve at least the above objectives, the present disclosure provides a method and device for fingerprint image generation for fingerprint image generation for saving memory, reducing the amount of bandwidth, and improving efficiency of the fingerprint recognition process.

BRIEF DESCRIPTION OF THE DRAWINGS

FIG. 2B is a table illustrating fingerprint image data for a first image of the total six pictures of FIG. 2A according to an embodiment of the present invention.

FIG. 2C is a table illustrating fingerprint image data for a second image of the total six images of FIG. 2A according to an embodiment of the present invention.

FIG. 2D is a table illustrating fingerprint image data for the second image minus the first image of the total six images of FIG. 2A according to an embodiment of the present invention.

FIG. 3B is a table illustrating fingerprint image data for a second image of the total six images of FIG. 3A according to an embodiment of the present invention.

FIG. 3C is a table illustrating fingerprint image data for a third image of the total six images of FIG. 3A according to an embodiment of the present invention.

FIG. 3D is a table illustrating fingerprint image data for the third image minus the second image of the total six images of FIG. 3A according to an embodiment of the present invention.

FIG. 4A includes tables illustrating fingerprint image data for a first page of image data, a second page of image data, a third page of image data, the first image minus the minimal pixel data value of the first image, and the second image minus the minimal pixel data value of the second image, and the third image minus the minimal pixel data value of the third image according to an embodiment of the present invention.

FIG. 5A includes tables illustrating fingerprint image data for a first image, a second image, a third image, the first image minus the first image's minimal pixel data value, the second image minus the first image's minimal pixel data value, and the third image minus the first image's minimal pixel data value according to an embodiment of the present invention.

FIG. 6C is a close up drawing of the highlighted touch electrodes of FIG. 6B according to an embodiment of the present invention.

DETAILED DESCRIPTION OF THE INVENTION

To facilitate understanding of the object, characteristics and effects of this present disclosure, embodiments together with the attached drawings for the detailed description of the present disclosure are provided.

Figure 1A:
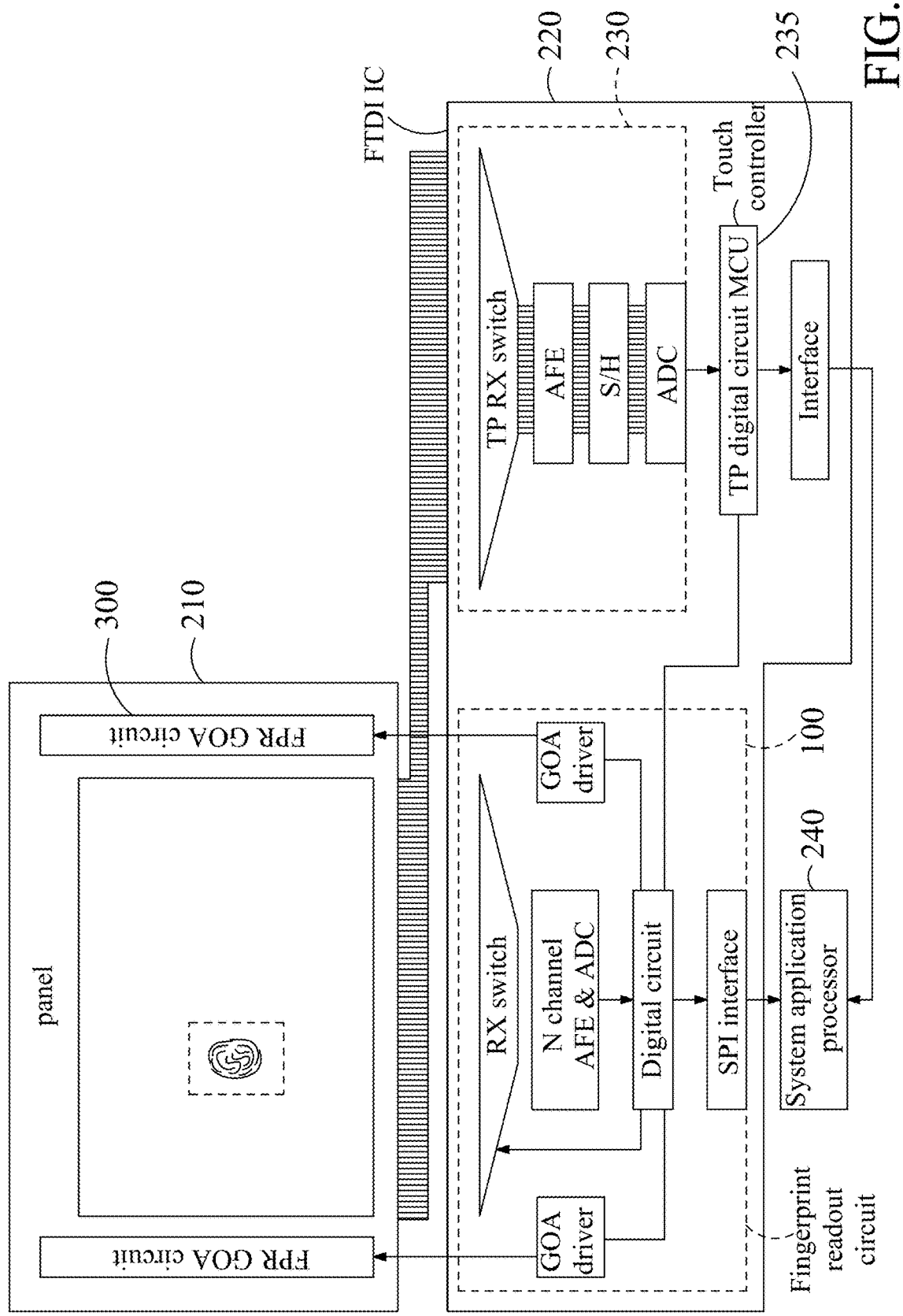
FIG. 1A is a drawing illustrating a fingerprint recognition system according to an embodiment of the present invention.
Figure 1B:
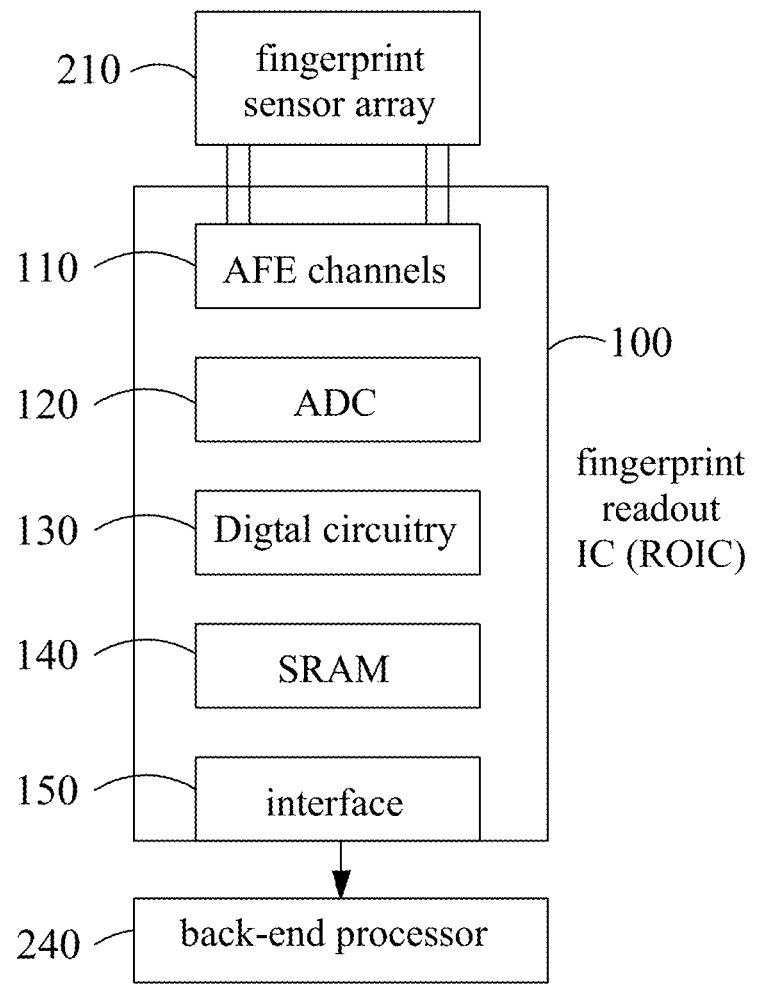
FIG. 1B is a drawing illustrating fingerprint readout circuit and system according to an embodiment of the present invention.

Refer to FIG. 1A which is a drawing illustrating a fingerprint recognition system and to FIG. 1B which is a drawing illustrating fingerprint readout circuit and system according to an embodiment of the present invention.

A fingerprint readout circuit 100 can be embodied as a microcontroller or can be integrated with a display driving circuit and a touch control circuit into one single chip, i.e. a fingerprint, touch, and display integration (FTDI) 220, for driving the touch screen of an electronic device, such as a cell phone. A fingerprint sensor is a fingerprint sensing pixel array 210, which can be embedded in a touch screen or provided on the touch screen. The fingerprint readout circuit 100 acquires multiple images from the fingerprint sensor to output multiple pages of fingerprint image data, which are transmitted to a back-end processor 240, such as a system application processor of a cell phone. The back-end processor 240 performs image processing based on the multiple pages of images to obtain clearer fingerprint images for fingerprint verification, i.e. to verify whether the input fingerprint is a user's registered fingerprint.

Supposing that one page of fingerprint image data has a data volume of 270×270×12 bits (based on the active fingerprint sensor array has 270×270 pixels) and an image is acquired six times, for example. Then, the fingerprint readout circuit would need a space in SRAM 140 as large as 270×270×12 bits×6 for storing these six pages of images, forming a considerable usage of SRAM 140.

In cases when the fingerprint readout circuit 100 is a microcontroller, the SRAM 140 is located in the microcontroller; or, in cases when the fingerprint readout circuit 100 is integrated with a display driving circuit and a touch control circuit 230 into one single chip (FTDI) 220, the SRAM 140 is located in the integrated chip.

The fingerprint readout integrated circuit (ROIC) 100 further comprises analog front end (AFE) channels 110, an analog to digital converter (ADC) 120, digital circuitry 130, and an interface 150 connecting the fingerprint readout IC 100 to the back-end processor 240.

Figure 2A:
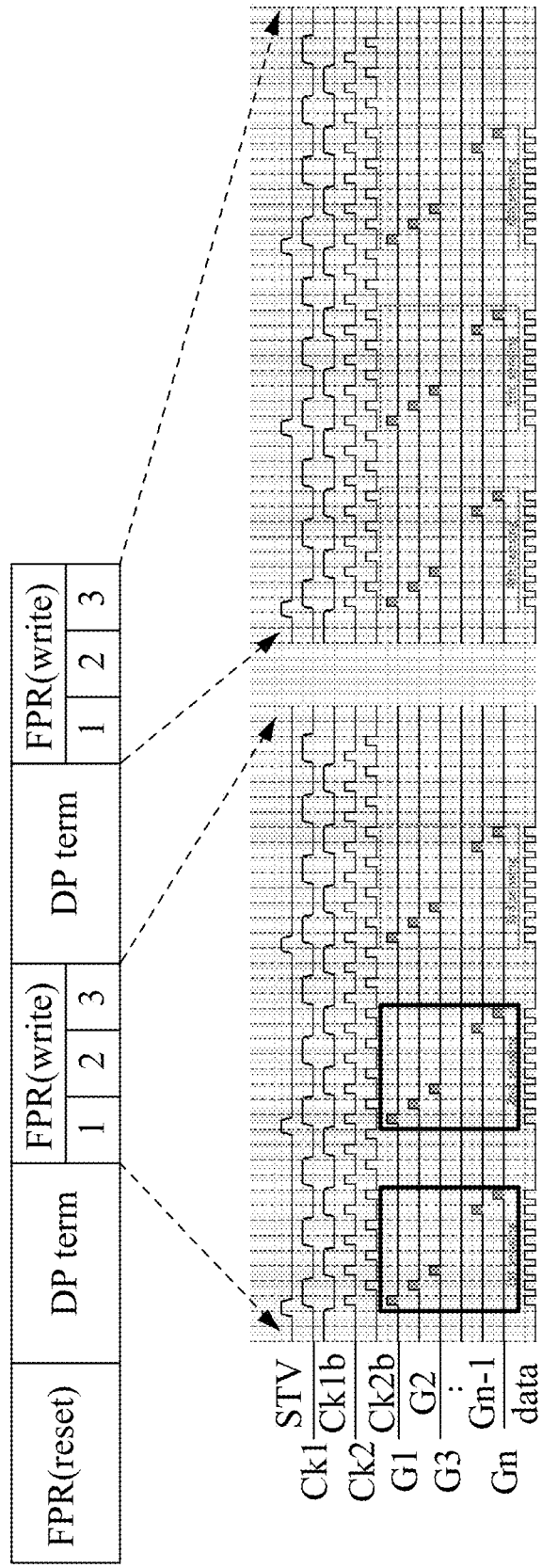
FIG. 2A is a drawing illustrating six images of fingerprint image data for a fingerprint image generation method according to an embodiment of the present invention.

Refer to FIG. 2A which is a drawing illustrating six images of fingerprint image data for a fingerprint image generation method, FIG. 2B which is a table illustrating fingerprint image data for a first image of the total six pictures of FIG. 2A, FIG. 2C which is a table illustrating fingerprint image data for a second image of the total six images of FIG. 2A, and FIG. 2D which is a table illustrating fingerprint image data for the second image minus the first image of the total six images of FIG. 2A according to an embodiment of the present invention. Also, continue referring to FIG. 1A and FIG. 1B.

In the embodiment illustrated in FIGS. 2A-2D, a fingerprint readout circuit 100 acquires images multiple times within a continuous exposure time period, and stores image data using a value differencing or compression technique to save SRAM space.

Although the fingerprint data is obtained at different exposure times, they should have very closely related data values. Therefore, for other images obtained after the first page of image data, only the difference value between them and their respective preceding pages of image data is stored to save SRAM space and reduce the data volume transmitted by the fingerprint sensing module 210 to the back-end processor 240, such as the application processor (AP) of a cell phone, or in other words, to save the transmission bandwidth.

For example, when the stored data volume of the first page of image data is 270×270×12 bits and the stored data volume of each of the second to the sixth pages of images is 270×270×10 bits (i.e. only the difference value between each image and its preceding page of image data is stored, and ¾ of the space of SRAM 140 can be saved.

When the fingerprint readout circuit 100 acquires the first page of image data, it will store the full data of 270×270×12 bits of the first image in SRAM 140.

When the fingerprint readout circuit 100 acquires the second page of image data, it will calculate line by line to obtain the difference value between the second and the first page of image data (i.e. to obtain the difference in data at the same finger pixel position of the two pages of images) and stores only the difference value in SRAM 140. Since multiple pages of images are acquired in a continuous exposure time period, and the second page of image data has an exposure time longer than that of the first page of image data, a positive code will be obtained from the above subtraction of first page of image data from the second page of image data. Referring to the tables illustrated in FIGS. 2B-2D as an example, for the same pixel position, the data of the second page of image data that is actually stored in SRAM is 279 instead of 1436.

In this embodiment, the code generated by the ADC is higher when the exposure time is longer (this is due to the analog voltage converted by the ADC becomes larger because of the longer exposure time). On the other hand, in embodiments where the code is lower when the exposure time is longer, the difference value is obtained by Image (N)-Image(N-1).

The following is given as an example in application. The method for fingerprint image generation for saving memory in this example comprises capturing six fingerprint images of six different exposures.

The fingerprint first image is captured at a complete 270×270×12 bits of data.

The second image is then captured. The first image is subtracted from the second image (the image data at the same position is subtracted) to obtain the difference between the first and second image. Since the second image has a longer exposure than the first image, the difference between first image and the second image will be a positive number when the first image is subtracted from the second image.

The method then obtains the difference in data at the same finger pixel position of the two pages of images. As shown in FIG. 2B, the first image data is 1157. As shown in FIG. 2C, the second image data is 1436. As shown in FIG. 2D, the second image data minus the first image data is 279. While the complete 1157 is stored for the first image, only the difference between the first and second image is stored (279). This greatly reduces the amount of memory, for example SRAM, required for the fingerprint recognition system.

Figure 3A:
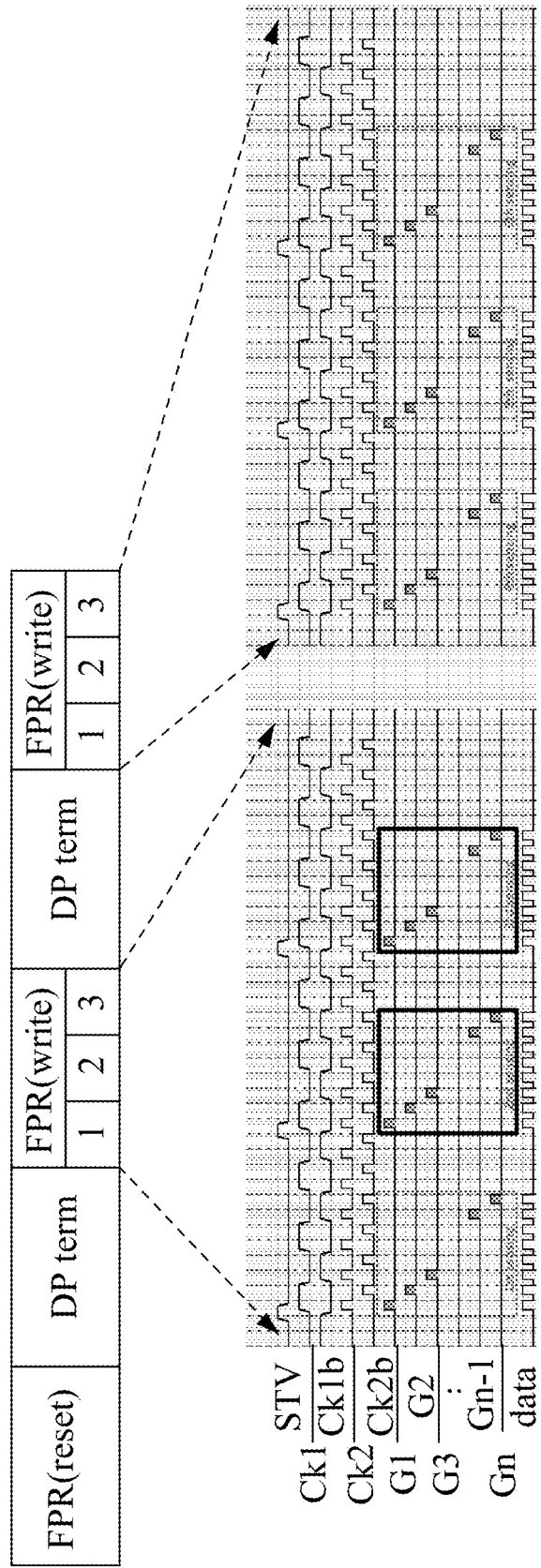
FIG. 3A is a drawing illustrating six images of fingerprint image data for a fingerprint image generation method according to an embodiment of the present invention.
Figure 3E:
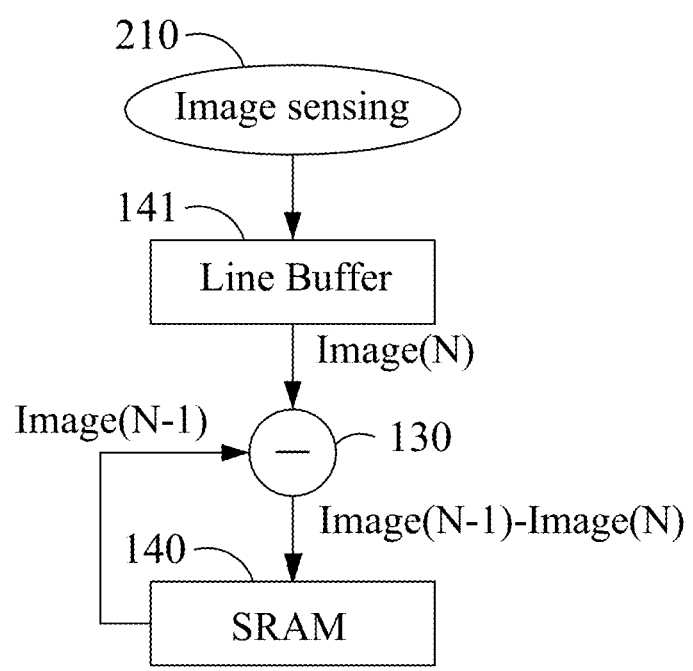
FIG. 3E is a drawing illustrating the flow of the fingerprint image generation method according to an embodiment of the present invention.

Refer to FIG. 3A which is a drawing illustrating six images of fingerprint image data for a fingerprint image generation method, FIG. 3B which is a table illustrating fingerprint image data for a second image of the total six images of FIG. 3A, FIG. 3C which is a table illustrating fingerprint image data for a third image of the total six images of FIG. 3A, FIG. 3D which is a table illustrating fingerprint image data for the third image minus the second image of the total six images of FIG. 3A, and FIG. 3E which is a drawing illustrating the flow of the fingerprint image generation method according to an embodiment of the present invention. Also, continue referring to FIG. 1A and FIG. 1B.

When the fingerprint readout circuit 100 acquires the third page of image data, it calculates line by line to obtain the difference value between the third and the second page of image data (i.e. to obtain the difference of data at the same finger pixel position of the two pages of images) and stores only the difference value in SRAM 140. Since multiple pages of images are acquired in a continuous exposure time period, and the third page of image data has an exposure time longer than that of the second page of image data, a positive code will be obtained from the above subtraction of the second image data from the third image data. Referring to the tables illustrated in FIGS. 2B-2D as an example, for the same pixel position, the data of the third page of image data that is actually stored in SRAM is 280 instead of 1716.

The image is acquired from the fingerprint sensing pixel array 210 row by row; and each time one page of image data is acquired, one line of data is stored in a buffer 141. Since the first page of image data does not have a preceding image, it is completely stored in the SRAM 140 at the original data size.

The following is given as an example in application. The method for fingerprint image generation for saving memory in this example comprises capturing six fingerprint images of six different exposures.

In the example, the third image is captured. The second image is subtracted from the third image (the same position is subtracted) to obtain the difference between the second and the third image. Since the third image has a longer exposure than the second image, the difference between the second image and the third image will be a positive number when the second image is subtracted from the third image.

This process is performed for all six pictures (image one, image two, image three, image four, image five, and image six).

As shown in FIG. 3B, the second image data is 1436. As shown in FIG. 3C, the third image data is 1716. As shown in FIG. 3D, the third image data minus the second image data is 280. Since only the difference between the second and third image is stored (280), the amount of SRAM required for the fingerprint recognition system is greatly reduced.

Since the fingerprint pictures are exposed at different times, the RAW data should be close, so only the differences are stored, which can save SRAM space and bandwidth (reduce the amount of data sent by SPI to AP).

For example, the first image is 270×270×12 bits. The second image is 270×270×10 bits (save the difference, save ¾ of the original SRAM space). The third image is 270×270×10 bits (save the difference, save ¾ of the original SRAM space). The fourth image is 270×270×10 bits (save the difference, save ¾ of the original SRAM space). The fifth image is 270×270×10 bits (save the difference, save ¾ of the original SRAM space). The sixth image is 270×270×10 bits (save the difference, save ¾ of the original SRAM space).

The RAW data of the fingerprint images exposed at different times will be close. The SRAM 140 only stores the original data size of the first image, and all others images have the difference stored. Assuming it is incremental data, a subtractive method is utilized.

As described above in regard to FIGS. 2A-3D, the first image's complete fingerprint image data (1157) is stored at original data size, the second image minus the first image's fingerprint image data (279) is stored as the second image's fingerprint image data, and the third image minus the second image's fingerprint image data (280) is stored as the third image's fingerprint image data.

Similarly, the first image's complete second fingerprint image data (897) is stored at original data size, the second image minus the first image's second fingerprint image data (246) is stored, and the third image minus the second image's second fingerprint image data (290) is stored.

Refer to FIGS. 3A-3E, FIG. 3F which is a schematic illustrating a fingerprint sensor circuit according to an embodiment of the present invention.

When acquiring the second page of image data, since the sensed voltage (FIG. 3F, Vout) is different than the voltage sensed when acquiring the first page of image data, the code generated by the fingerprint readout circuit 100 according to the sensed voltage is different than the code of the same fingerprint pixel in the first page of image data. Therefore, it is necessary to retrieve the code of the line in memory, for example SRAM 140, corresponding to the first page of image data, and then, from which the code of the line corresponding to the second page of image data is compared to obtain the difference value to store in the SRAM 140.

Starting from the second page of image data, only the difference value between the codes of any two corresponding lines in two consecutive pages of images is stored in SRAM 140.

The fingerprint readout circuit 100 transmits the complete data of the first page of image data and the difference values obtained for the subsequent pages of images to the back-end processor 240 (such as the AP of a cell phone) via the SPI (serial peripheral interface) 150.

Figure 3F:
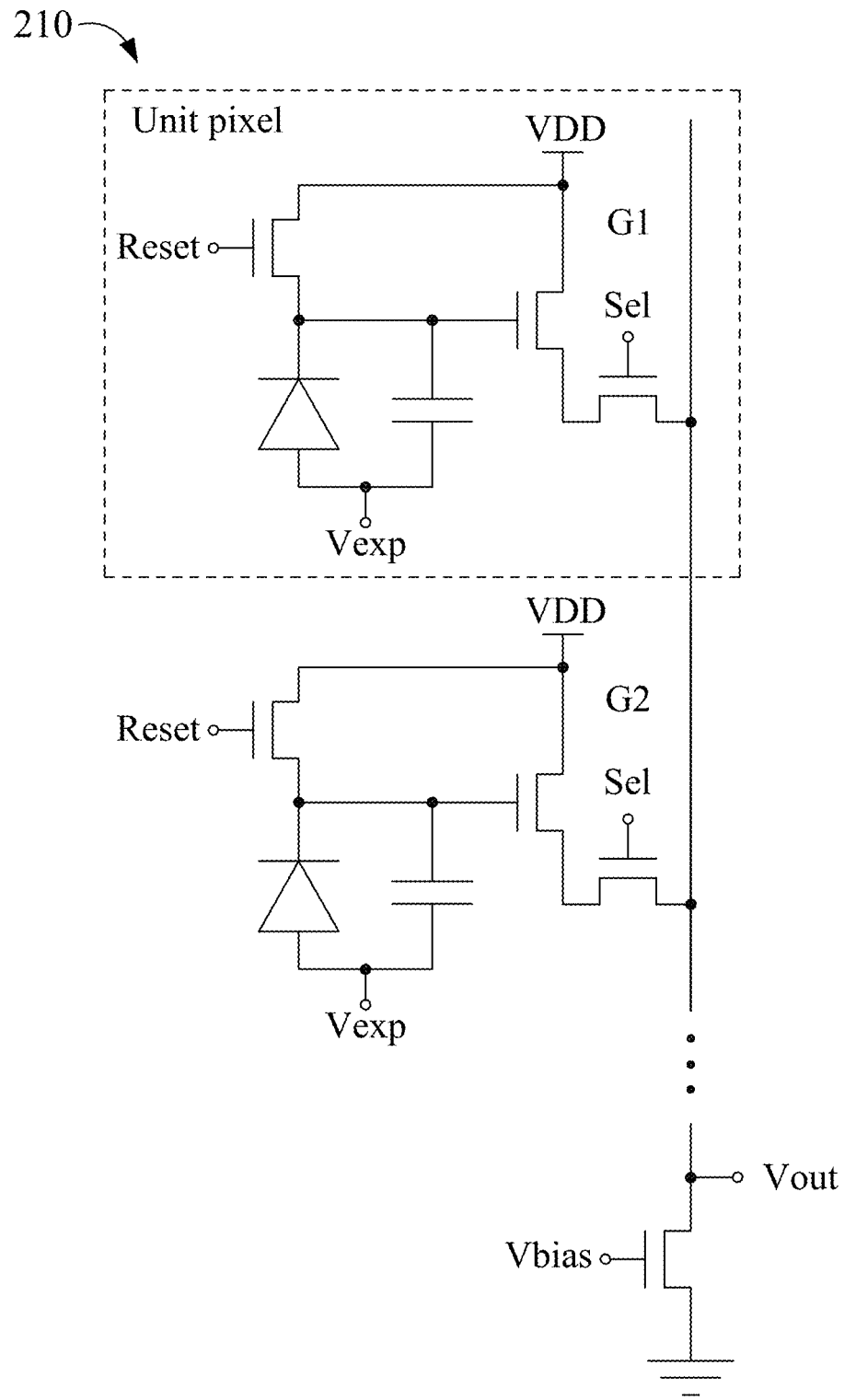
FIG. 3F is a schematic illustrating a fingerprint sensor circuit according to an embodiment of the present invention.

As illustrated in FIG. 3F, the fingerprint sensor circuit 210 comprises a plurality of fingerprint sensor circuit that output sensing voltage via the same sensing line Vout. Vout is electrically connected to the fingerprint readout circuit 100.

The selection signals Se1 at the lines in the fingerprint sensing pixel array 210 are also the G1-Gn in the sequence diagram shown in FIG. 2A and FIG. 3A.

Figure 3G:
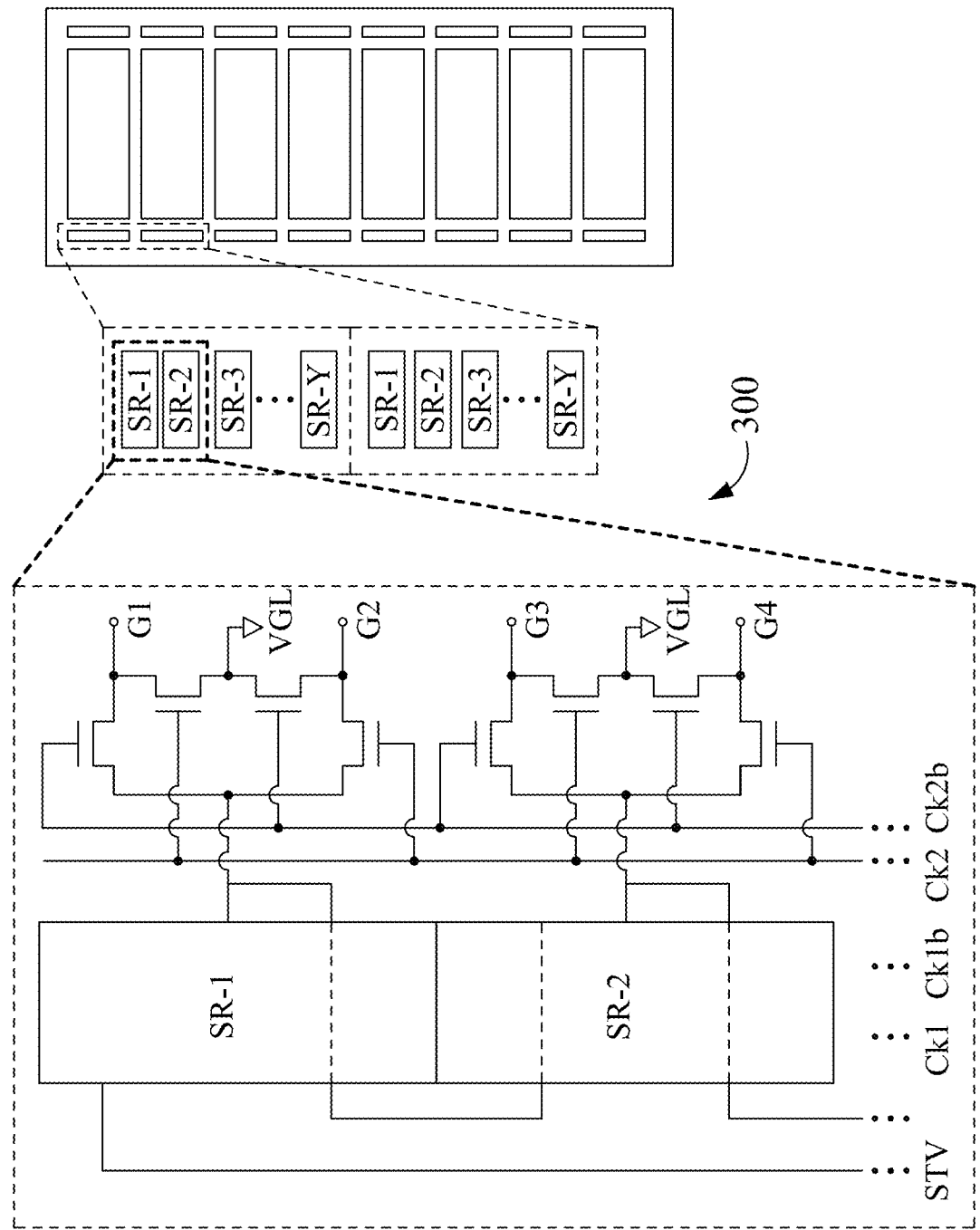
FIG. 3G is a drawing illustrating a fingerprint Gate Driver on Array (GOA) circuit (marked as FPR GOA circuit 300 in FIG. 1A) of a panel according to an embodiment of the present invention.

Refer to FIG. 3G which is a drawing illustrating a fingerprint Gate Driver on Array (GOA) circuit (marked as FPR GOA circuit 300 in FIG. 1A) of a panel according to an embodiment of the present invention. The FPR GOA circuit is a fingerprint scan circuit 300.

The FPR GOA circuit 300 receives the STV signal and the clock signals Ck1/Ck1b and Ck2/Ck2b output by the fingerprint readout circuit 100. The STV signal is shifted according to the clock signals Ck1/Ck1b, and the selection signals Se1 at the lines of the fingerprint sensing array 210 are then generated according to the clock signals Ck2/Ck2b, i.e. the G1~Gn in the sequence diagrams illustrated in FIG. 2A and FIG. 3A.

Figure 4B:
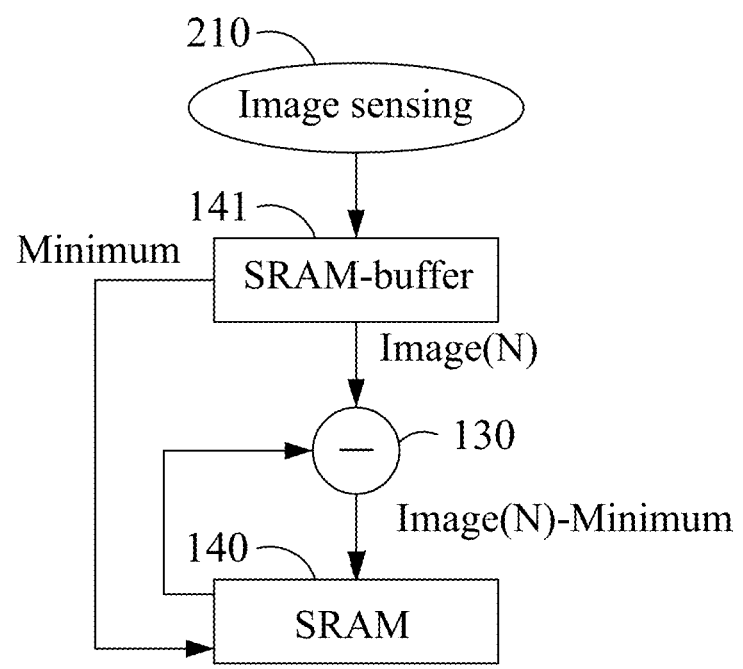
FIG. 4B is a drawing illustrating the flow of the fingerprint image generation method according to an embodiment of the present invention.

Refer to FIG. 4A which includes tables illustrating fingerprint image data for a first page of image data, a second page of image data, a third page of image data, the first image minus the minimal pixel data value of the first image, and the second image minus the minimal pixel data value of the second image, and the third image minus the minimal pixel data value of the third image and to FIG. 4B which is a drawing illustrating the flow of the fingerprint image generation method according to an embodiment of the present invention. Also, continue referring to FIG. 1A and FIG. 1B.

Since all the pages of images are very close in their background values, the minimum code can be subtracted from the data of each page of images before storing the image data in SRAM 140. However, it is necessary to correspondingly record the minimum code of each page of images.

In this way, for each fingerprint pixel, the 12-bit raw data of each page of image data can be represented in 10-bits and plus the minimum code of the page of image data to thereby save SRAM space to be used. In the tables illustrated in FIG. 4A, the data in the lower tables show the data of each page of image data that are really stored.

First, the current Image N is stored in a buffer 141, which can be an area in the SRAM 140 for temporarily storing data. Before a next page of image data is stored in the buffer 141, the minimum value of the pixel data (i.e. the minimum code or minimal pixel data) of the current image is obtained. Then, the minimal pixel value is subtracted from each of the pixel data of the current image before storing the data of the current image in SRAM 140, so as to reduce the required SRAM space.

The fingerprint readout circuit 100 transmits the minimal pixel data of all pages of images and the data of difference values to the AP via the SPI interface 150, and the AP can recover the image data according to the stored minimal pixel data and difference values.

The following is given as an example in application. The method for fingerprint image generation for saving memory in this example comprises capturing plurality of fingerprint images of different exposures.

In this example, the method comprises the following. Since the background value of each image is close, before saving into SRAM 140, the minimum RAW data value of each image is recorded and the minimum RAW Data of each image is cut.

For example, 2 to the 12th power of raw data, can be expressed as 2 to the 10th power+minimum raw data, which can reduce the required storage space of SRAM, and the data can be restored after the serial peripheral interface (SPI) 150 sends it to the application program (AP). The lower tables in bold in FIG. 4A represent the actual stored data.

For example, the first page of image data is captured. Among the first page of image data it is determined that the minimal pixel value is 716. Then, 716 is subtracted from all first page image data and stored. Since 716 is the minimal pixel value, the result for this image data is 0.

Then the second page of image data is captured. Among the second page of image data it is determined that the minimal pixel value is 986. Then, 986 is subtracted from all second page image data and stored. For example, the original image data was 1035, the result for this image data is 49.

Then the third page of image data is captured. Among the third page of image data it is determined that the minimal pixel value is 1231. Then, 1231 is subtracted from all third page image data and stored. For example, the original image data was 1403, the result for this image data is 172.

This process is repeated for all of the plurality of captured images.

Figure 5B:
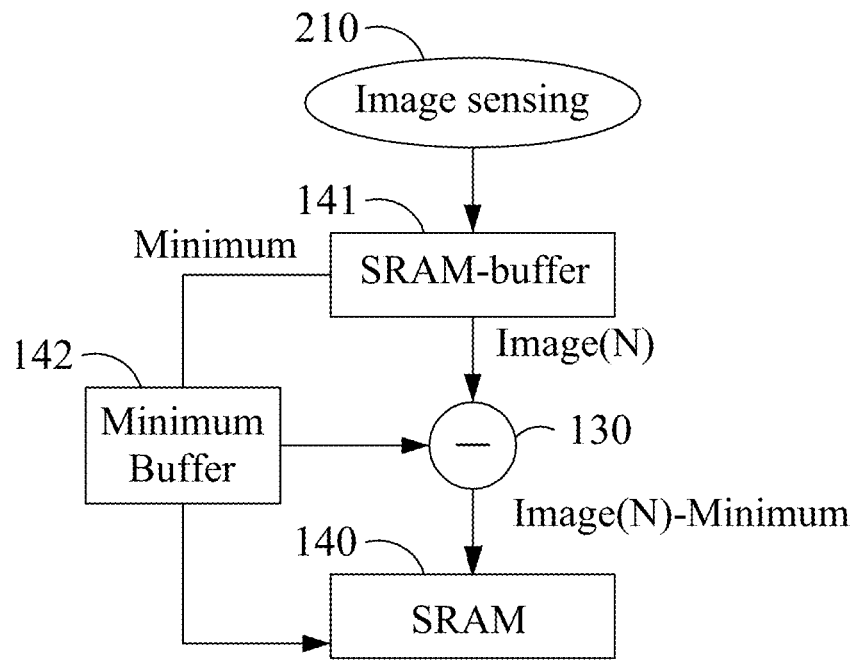
FIG. 5B is a drawing illustrating the flow of the fingerprint image generation method according to an embodiment of the present invention.

Refer to FIG. 5A which includes tables illustrating fingerprint image data for a first image, a second image, a third image, the first image minus the first image's minimal pixel data value, the second image minus the first image's minimal pixel data value, and the third image minus the first image's minimal pixel data value and to FIG. 5B which is a drawing illustrating the flow of the fingerprint image generation method according to an embodiment of the present invention. Also, continue referring to FIG. 1A and FIG. 1B.

In this embodiment before storing the pages of images (including the first page of images) in SRAM 140, the method first subtracts the minimum pixel data of the first page of image data from the data of each of the pages of images.

In this way, for each fingerprint pixel, the 12-bit raw data of each page of images can be represented in 10-bits and plus the minimal pixel value of the first page of image data to thereby save SRAM space to be used. In the tables illustrated in FIG. 5A, the data in the lower tables show the data of each page of images that are really stored.

First, the complete image of the first page of image data is stored in a buffer 141, which can be an area in SRAM 140 for temporarily storing data. Before the second page of image data is stored in the buffer 141, the minimum value of the pixel data (i.e. the minimal pixel data) of the first page of image data is obtained and stored in the minimum buffer 142, and the minimal pixel data of the first page of image data in the minimum buffer 142 is stored in SRAM 140. Then, the minimal pixel data of the first page of image data stored in the minimum buffer 142 is subtracted from each of the pixel data of the second page of image data and the obtained difference values are stored in SRAM 140, so as to reduce the required SRAM space.

The fingerprint readout circuit 100 transmits the minimal pixel data of the first page of image data and the data of the difference value between the minimal pixel data of the first page of image data and each of the other pages of image data to the AP via the SPI interface 150, and the AP can recover the image data according to the stored minimal pixel data and the difference value data.

Figure 6A:
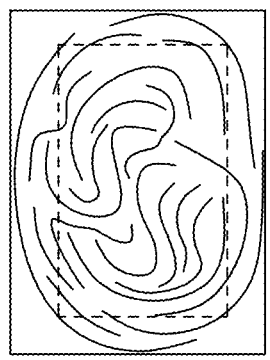
FIG. 6A is a drawing illustrating an area to be sensed by the fingerprint readout circuit according to an embodiment of the present invention.
Figure 6B:
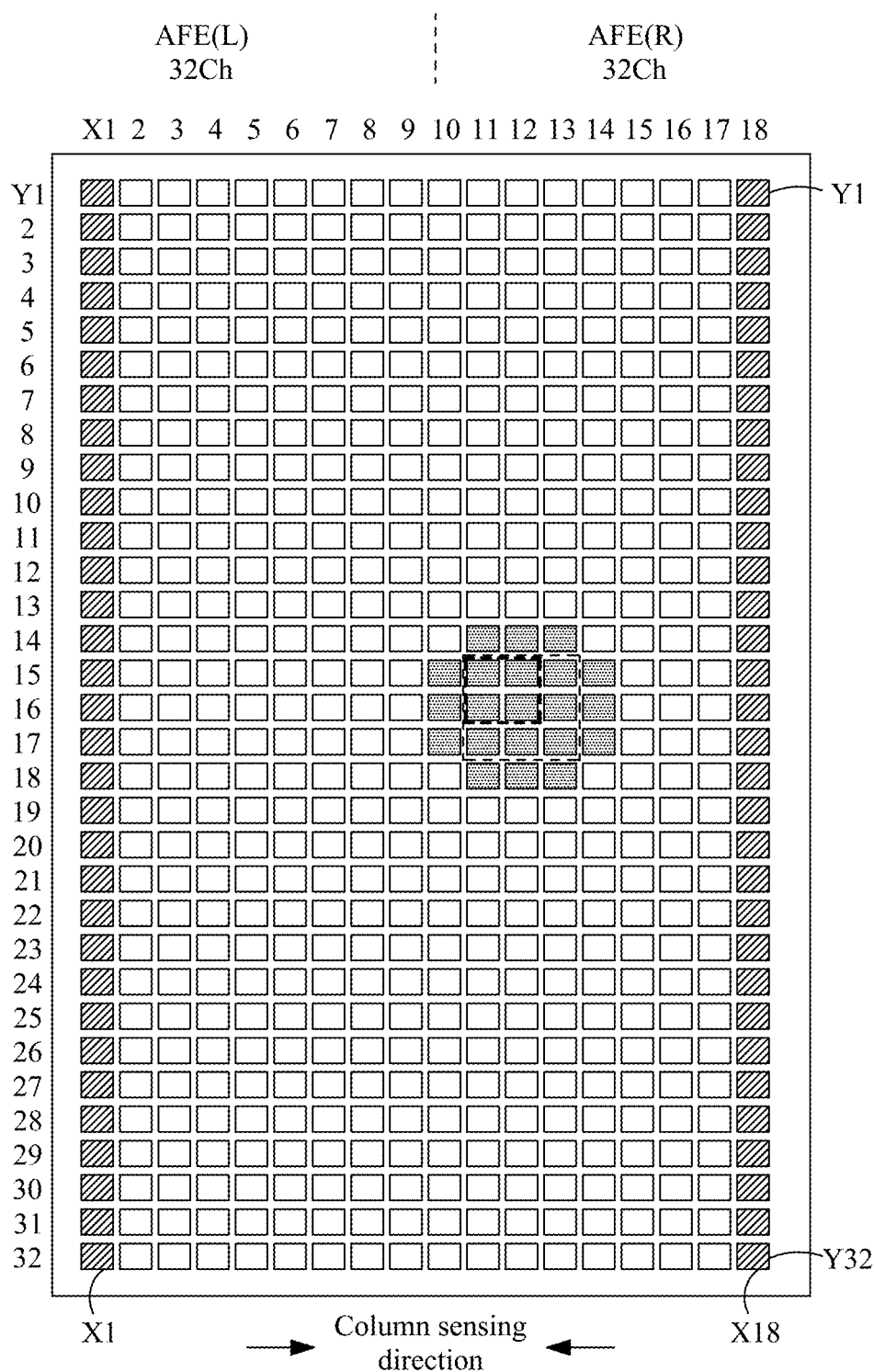
FIG. 6B is a drawing illustrating a touch electrode array according to an embodiment of the present invention.

Refer to FIG. 6A which is a drawing illustrating an area to be sensed by the fingerprint readout circuit 100, FIG. 6B which is a drawing illustrating a touch electrode array 210, and FIG. 6C which is a close up drawing of the highlighted touch electrodes of FIG. 6B according to an embodiment of the present invention. Also, continue referring to FIG. 1A and FIG. 1B.

The area that can be sensed by the fingerprint readout circuit 100 (i.e. the area framed by the solid line in FIG. 6A) is usually larger than the fingerprint that can be clearly obtained. Since the fingerprint is not always fully impressed, and pressure applied at the peripheral edges of the fingerprint is smaller relative to the pressure applied at the central area of the fingerprint, the fingerprint impression is usually unclear at its borders.

In this embodiment, the fingerprint has an effective area determined according to a touch sensing value, as the area framed by the dash lines shown in FIG. 6A and having upper, lower, left and right borders. Data of the effective fingerprint area relates to the area of fingerprint sensing lines and the area of fingerprint scan lines. For example, a touch controller 235 determines which of the touch sensing electrodes output a touch sensing value larger than a preset value, and decides the effective fingerprint area accordingly. And, data of the effective fingerprint area is transmitted to the fingerprint readout circuit 100.

When sensing the fingerprint, only the data of the fingerprint image that is in the effective fingerprint area will be stored in the SRAM 140 by the fingerprint readout circuit, and data of the fingerprint image outside of the effective fingerprint area, such as the area in the above picture located between the solid line and the dashed lines, is not stored in SRAM 140, in order to save SRAM space. Data of the ineffective fingerprint area is also not transmitted to the back-end processor 240, in order to save SRAM in the fingerprint readout circuit and the time for transmitting the data to the AP, which in turn shortens the unlocking time and enhances the user's experience.

FIG. 6B illustrates an example of an 18×32 touch electrode array having a resolution of 1080*1920 pixels. In the touch sensing area corresponding to one touch electrode, there are 60 display pixels. In the case that the fingerprint sensor has a resolution the same as the display resolution, there are also 60 fingerprint sensing pixels in the touch sensing area corresponding on the touch electrode.

The touch electrodes highlighted in FIG. 6B output a sensing value indicating that a touch has occurred. The highlighted block corresponds to the touched area. But the maximum touch sensing value is not necessarily found at the center of the touched area.

A larger touch sensing value indicates the fingerprint image sensed in the area is quite clear. For the back-end processor 240, the fingerprint verification can be done according to a partial but relatively clear fingerprint image, and not necessarily according to a complete fingerprint image.

After obtaining the touch sensing values of the touch electrodes from the touch sensing circuit, the touch controller 235 can determine, according to a critical value, which of the touch electrodes have detected the occurrence of a touch. For example, the touch electrodes highlighted in FIG. 6B have touch sensing values corresponding to the values highlighted in FIG. 6C. Since all the values highlighted in FIG. 6C are larger than a critical value of 60, it is determined that a touch has occurred.

Further, the touch controller 235 determines which of the touch electrodes have a touch sensing value larger than a preset value, and the area corresponding to the touch electrodes having touch sensing values larger than the preset value is used as the effective fingerprint area. The preset value would influence the area size of the effective fingerprint area. For example, when the preset value is 150, the area corresponding to the 9 touch electrodes enclosed in the outer dashed lines of FIG. 6B (X=11~13, Y=15~17) is the effective fingerprint area. Or, when the preset value is 100, the area corresponding to the 4 touch electrodes enclosed in the inner dashed lines of FIG. 6B (X=11~12, Y=15~16) is adopted as the effective fingerprint area.

Since the touch sensing area corresponding to one touch electrode includes 60 fingerprint sensing pixels, and if a relatively small effective fingerprint area is needed, the touch controller 235 can calculate to decide if the effective fingerprint area is horizontally extended rightward from the 601st (=10*60+1) fingerprint sensing line to the 720th (=12*60) fingerprint sensing line and vertically extended downward from the 841st (14*60+1) fingerprint scan line to the 960th (=16*60) fingerprint scan line to have an area of 120*120 fingerprint sensing pixels, and transmits information of the above effective fingerprint area to the fingerprint readout circuit. When sensing the FPR, even though the fingerprint readout circuit turns on 200 sensing channels (connected to 200 sensing lines) and 200 scan lines (the numbers are illustrative only), it can store only the fingerprint data in the effective fingerprint area in SRAM, while the fingerprint data outside the effective fingerprint area is not stored in SRAM to save SRAM space.

Figure 7A:
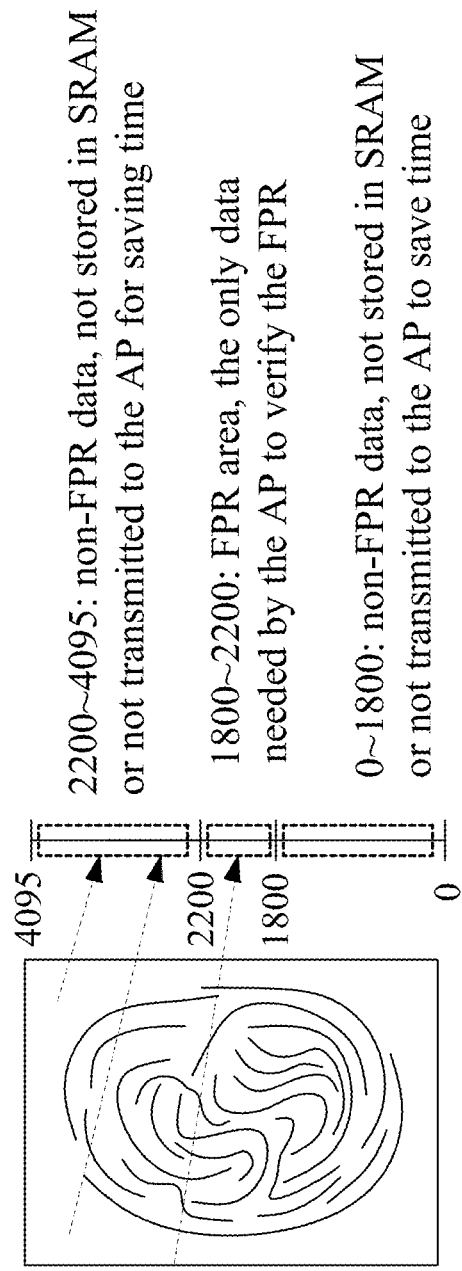
FIG. 7A is a drawing illustrating fingerprint capture areas and analog to digital converter (ADC) code distribution according to an embodiment of the present invention.
Figure 7B:
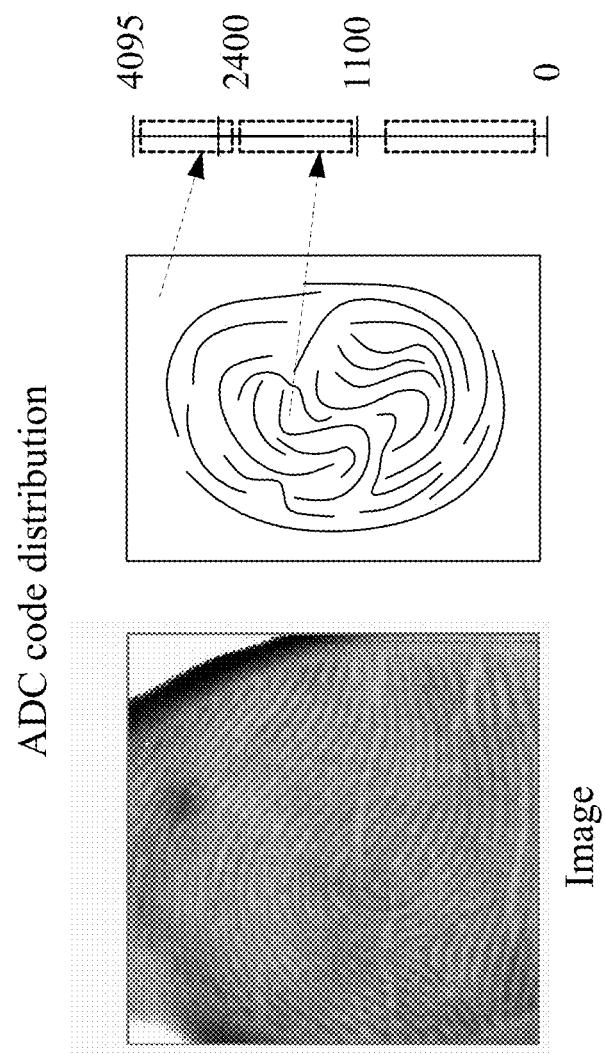
FIG. 7B is a drawing illustrating fingerprints and ADC code distribution according to an embodiment of the present invention.

Refer to FIG. 7A which is a drawing illustrating fingerprint capture areas and analog to digital converter (ADC) code distribution and FIG. 7B which is a drawing illustrating fingerprints and ADC code distribution according to an embodiment of the present invention.

An effective numerical range of fingerprint data is defined between a code higher than a middle code of the fingerprint data range (e.g. code 2000) by a predetermined range and a code lower than the middle code by a predetermined range, as the area with the solid frame shown in the ADC code distribution diagram illustrated in FIG. 7A. Assuming the 12-bits of ADC code has a full range of 0~4095, the ADC codes corresponding to the fingerprint ridges and the fingerprint valleys will fall in the range from 1800 to 2200

(2000+/−200). In other words, codes 0~1800 and codes 2200~4095 corresponding to the areas outside the solid line frame in the ADC code distribution diagram below are not in the effective numerical range of the fingerprint data, and is referred to as the negligible numerical range of the fingerprint image data.

The fingerprint readout circuit 100 calculates according to the received sensing voltages to obtain corresponding ADC codes. In the event that the obtained ADC codes fall in the negligible numerical range, they are not stored in SRAM 140 to save SRAM space. In this way, only the fingerprint image data within the effective numerical range is transmitted by the fingerprint readout circuit to the back-end processor 240, while the negligible fingerprint image data is not transmitted to further save the time needed for data transmission and to enhance the user's experience.

Taking the fingerprint image acquired under a strong light as an example, the effective numerical range of the fingerprint data is approximately between codes 1100 and 2400. This is because the effective numerical range of fingerprint data is in connection with the light strength during the fingerprint sensing array exposure. Actually, the effective numerical range of the fingerprint data won't distribute with the middle value of the ADC code full range (e.g. code 0~4095 in 12-bit ADC) as a center.

In an embodiment of the present invention, the method comprises eliminating the two most significant bits (MSB) from the original data size of 270×270×12 bits to generate a compressed image data size of 270×270×10 bits.

In embodiments of the present invention, a combination of embodiments is used to implement the method of fingerprint image generation for saving memory of the present invention.

While the present disclosure has been described by means of specific embodiments, numerous modifications and variations could be made thereto by those skilled in the art without departing from the scope and spirit of the present disclosure.

What is claimed is:

1. A method of fingerprint image generation for saving memory comprising:
    generating a first fingerprint image of an original data size according to a plurality of first analog sensing signals which are read from a fingerprint sensor array when a first exposure time elapses after a start of an exposure period;
    storing the first fingerprint image represented by a first data size which is equivalent to or smaller than the original data size;
    generating a second fingerprint image of the original data size according to a plurality of second analog sensing signals which are read from the fingerprint sensor array when a second exposure time elapses after the start of the exposure period, when the length of the second exposure time is longer than the length of the first exposure time and the second exposure time ends after the first exposure time ends; and
    storing the second fingerprint image represented by a compressed data size smaller than the original data size.

2. The method of fingerprint image generation for saving memory according to claim 1, further comprising:
    generating a third fingerprint image of the original data size after generating the second fingerprint image of the original data size according to a plurality of third analog sensing signals which are read from the fingerprint sensor array during the exposure period; and
    storing the third fingerprint image represented by the compressed data size smaller than the original data size.

3. The method of fingerprint image generation for saving memory according to claim 1, further comprising:
    generating the second fingerprint image represented by the compressed data size by calculating a difference image between the first fingerprint image of the original data size and the second fingerprint image of the original data size.

4. The method of fingerprint image generation for saving memory according to claim 3, further comprising:
    storing the second fingerprint image of the original data size.

5. The method of fingerprint image generation for saving memory according to claim 4, further comprising:
    generating a third fingerprint image of the original data size after generating the second fingerprint image of the original data size according to a plurality of third analog sensing signals which are read from the fingerprint sensor array during the exposure period;
    generating the third fingerprint image represented by the compressed data size smaller than the original data size by calculating a difference image between the second fingerprint image of the original data size and the third fingerprint image of the original data size; and
    storing the third fingerprint image represented by the compressed data size.

6. The method of fingerprint image generation for saving memory according to claim 1 further comprising:
    storing the first fingerprint image of the original data size;
    acquiring a first reference pixel data among the first fingerprint image of the original data size, wherein the first reference pixel data is the minimal pixel data among the first fingerprint image of the original data size; and
    generating the first fingerprint image represented by the first data size smaller than the original data size by subtracting the first reference pixel data from the first fingerprint image of the original data size.

7. The method of fingerprint image generation for saving memory according to claim 6, further comprising:
    storing the second fingerprint image of the original data size;
    acquiring a second reference pixel data among the second fingerprint image of the original data size, wherein the second reference pixel data is the minimal pixel data among the second fingerprint image of the original data size; and
    generating the second fingerprint image represented by the compressed data size by subtracting the second reference pixel data from the second fingerprint image of the original data size.

8. The method of fingerprint image generation for saving memory according to claim 6, further comprising:
    generating the second fingerprint image represented by the compressed data size by subtracting the first reference pixel data from the second fingerprint image of the original data size.

9. The method of fingerprint image generation for saving memory according to claim 1, further comprising:
    storing the first fingerprint image of the original data size;
    acquiring a first reference pixel data among the first fingerprint image of the original data size, wherein the first reference pixel data is the minimal pixel data among the first fingerprint image of the original data size; and generating the second fingerprint image represented by the compressed data size smaller than the original data size by subtracting the first reference pixel data from the second fingerprint image of the original data size.

10. The method of fingerprint image generation for saving memory according to claim 1, further comprising:

transmitting the first fingerprint image represented by the first data size to and the second fingerprint image represented by the compressed data size to a back-end processor.

11. The method of fingerprint image generation for saving memory according to claim 10, further comprising:

transmitting a first compressed reference pixel data, which is generated based on the minimal pixel data among the first fingerprint image of the original data size to the back-end processor; and transmitting a second compressed reference pixel data, which is generated based on the minimal pixel data among the second fingerprint image of the original data size to the back-end processor.

12. A device for fingerprint image generation for saving memory comprising:

an analog to digital converter for generating a first fingerprint image of an original data size according to a plurality of first analog sensing signals which are read from a fingerprint sensor array when a first exposure time elapses after a start of an exposure period;

a memory for storing the first fingerprint image represented by a first data size which is equivalent to or smaller than the original data size;

the analog to digital converter generating a second fingerprint image of the original data size according to a plurality of second analog sensing signals which are read from the fingerprint sensor array when a second exposure time elapses after the start of the exposure period, wherein the length of the second exposure time is longer than the length of the first exposure time and the second exposure time ends after the first exposure time ends; and the memory storing the second fingerprint image represented by a compressed data size smaller than the original data size.

* * * * *